Oct. 22, 1968     F. P. BRILANDO ET AL     3,406,587
BICYCLE GEAR SHIFT MECHANISM
Filed Sept. 23, 1966
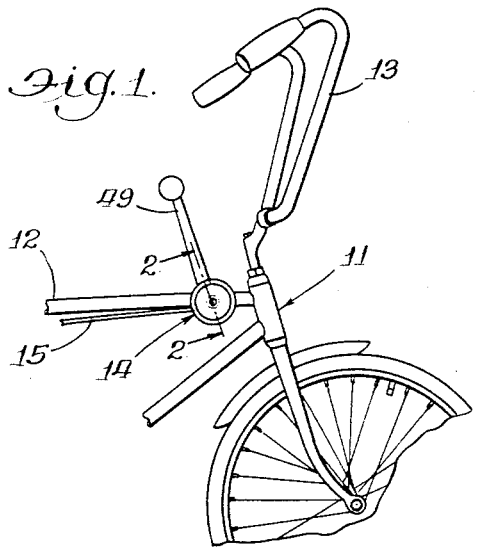
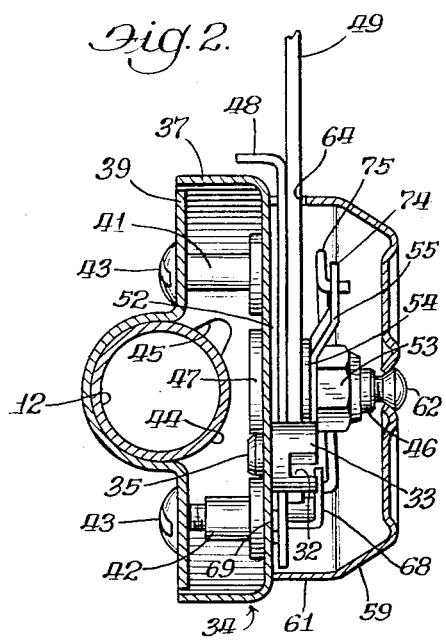
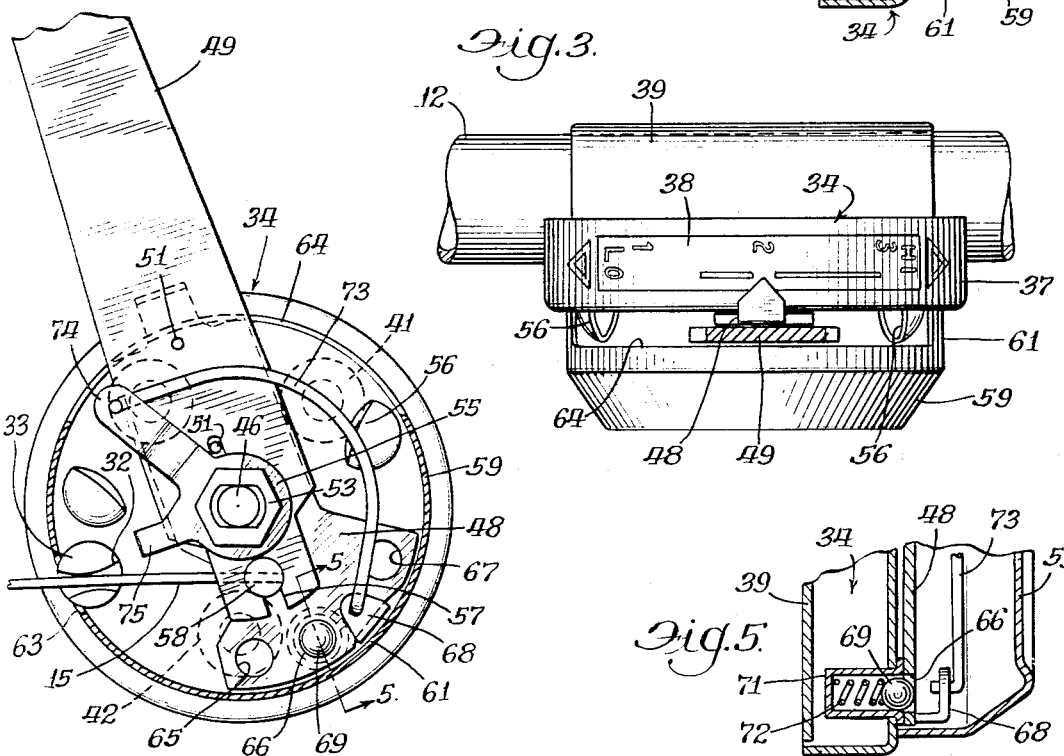
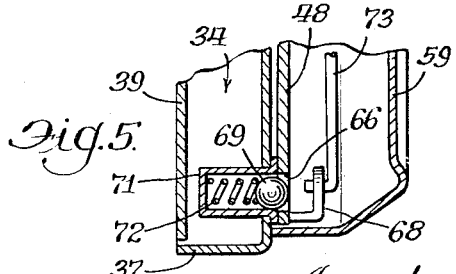
Inventors
Frank P. Brilando and
Rudolf J. Blaho
By Horton, Davis,
Brewer & Brugman
Attys.

United States Patent Office 3,406,587
Patented Oct. 22, 1968

3,406,587
BICYCLE GEAR SHIFT MECHANISM
Frank P. Brilando, Niles, and Rudolph G. Blaho, Franklin Park, Ill., assignors to Schwinn Bicycle Company, a corporation of Illinois
Filed Sept. 23, 1966, Ser. No. 581,619
6 Claims. (Cl. 74—475)

ABSTRACT OF THE DISCLOSURE

Manually operable mechanism for shifting a planetary gear hub transmission for a bicycle, comprising a shift lever supported on mounting means for selective movement between low, intermediate and high positions, means for positionally restraining the shaft lever in each of those positions, and spring means interconnected between the mounting means and the shift lever having a dead center position when the shift lever is in intermediate position and operable when the latter is moved manually therefrom toward either low or high positions to assist such manual movement of the shift lever.

---

This invention relates in general to gear shifting mechanisms, and more particularly to improvements in means for shifting planetary gear type hub transmissions for bicycles.

In well-known three-speed bicycle hub transmissions, it is customary to employ a spring that tends to move the parts automatically toward the high gear position. Consequently, some form of releasable latching means must be provided for retaining the parts in any one of the three selectable positions, particularly low or first and intermediate or second. One of the objects of this invention, therefore, is to provide improved means for latching the parts of such a transmission in any of their selectable positions, together with a stick type of shift lever or manual operating member which facilitates selective shifting and readily overcomes the latching means. This object is attained in the specific embodiment herein illustrated by providing a spring-urged detent means, selectively engageable in different ones of a plurality of apertures or recesses in a latch plate comprising a functional extension of a relatively long shifting lever.

A difficulty with any such gear shifting mechanism is that as the sun gear moves during shifting from intermediate to high, it passes through a neutral or ineffective position in which driving forces applied to the bicycle pedals are not transmitted to the hub, and the consequent lack of resistance pedal movement may come unexpectedly and result in the rider being seriously injured, particularly if he is about to assume, or is in, a "standing" position on the pedals and the transmission parts hesitate in such nontransmitting position. This can come from a hurried or careless and incomplete operation of the shifting lever and despite the indicated tendency of the hub transmission spring to move the parts automatically toward the high gear position.

A principal object of this invention is to avoid such possible injuries to the rider by insuring completion of a shifting operation from intermediate to high, once it has been initiated manually, to assure substantaily instantaneous movement of the parts over, past or through their neutral or nontransmitting position.

Another object is to provide means for accomplishing this result which also will be effective to assist the rider in shifting in the opposite direction from intermediate to low gear.

These objects are attained in the present embodiment of the invention by providing a shift lever spring that is anchored at one end, has its other end secured to the latch plate or shift lever, and is so constructed as to exert a shift-assisting force upon the lever as the latter moves in either direction from its intermediate position. The specific spring herein illustrated is a C-spring having one end fixed against movement and the other end secured to the latch plate at a point on a line extending through the stationary end of the spring and the center of rotation of the latch plate when it is in the intermediate position, so that the spring is extended with its ends farthest apart when the shift lever is in intermediate position, and will be allowed to retract to move its ends closer together as the lever is moved in either direction, thereby to exert a shift-assisting force upon the lever as it is moved from second toward first or third. Shifting from second to first thus is facilitated because the shift lever spring helps to counteract the action of the hub transmission spring. And of greater importance, the likelihood of injury to the rider is substantially eliminanted when shifting from second to third because the transmission parts thus are moved almost instantaneously through their nontransmitting position, even if the rider is careless in his operation of the shift lever.

Numerous other objects and advantages of our invention will be apparent as it is better understood from the following description, which, when taken in connection with the accompanying drawings, discloses a preferred embodiment thereof.

In the drawings:

FIGURE 1 is a side elevation of a portion of a bicycle showing a stick shift mechanism embodying the features of this invention mounted thereon;

FIG. 2 is an enlarged transverse vertical section taken substantially on the line 2—2 of FIG. 1;

FIG. 3 is a top plan view of the stick shift mechanism of FIGS. 1 and 2, with the manually operable member thereof shown in section;

FIG. 4 is a side elevation similar to FIG. 1 of the stick shift mechanism, as seen from the right of FIG. 2, with the cover member in section; and FIG. 5 is a detail transverse section taken substantially on the line 5—5 of FIG. 4.

Referring more particularly to FIG. 1, reference numeral 11 indicates in general a bicycle which includes a frame 12 and handle bars 13. This figure illustrates one convenient location for attachment to the frame 12 of stick shift mechanism embodying the features of this invention and indicated generally by reference numeral 14. This mechanism is adapted to operate a control device, such as a well-known three-speed bicycle hub transmission, a four-speed or any other appropriate type of transmission, to selectively change the driving ratio between the pedal-driven sprocket and the rear wheel. To this end, the stick shift or manually operable mechanism is connected, in a manner to be described hereinafter in greater detail, to one end of a cable 15 (FIG. 4), the other or rear end of which is connected in well-known manner to the control device which it is intended to operate. The forward end portion of the cable 15 extends through, and is retained by, a slot 32 in a stud 33 (FIGS. 2 and 4) which is secured in any suitable manner to a main case member 34, as by means of a reduced end 35 which extends through a suitable aperture in the case 34. The slot 32 has its side surfaces curved to accommodate bending of the cable 15 during operative movements of the latter, and the case member 34 has a peripheral flange 37 on the outer surface of which may be mounted a suitable indicia-bearing member or decal 38 for a purpose to be referred to later.

Means are provided for adjustably mounting the stick shift mechanism 14 on the bicycle frame 12, and preferably conveniently near the handle bars 13, which comprises a clamping plate 39 (FIG. 2) having its central portion formed to accommodate and receive a longitudinally extending part of the frame 12 and dimensioned exteriorly to substantially enclose and lie within the peripheral flange 37 of the main case member 34. The latter is provided with a plurality of spacer nuts 41 and 42 having their head portions secured thereto, as by welding, and adapted to receive screws 43 extending through suitable apertures in the clamping plate 39. There are two such spacer nuts 41 on the upper portion of the case 34 and one such nut 42 on the lower portion thereof. As seen in FIG. 2, the peripheral flange 37 of the case 34 is cut away to provide recesses 44 for engagement with a bar of the bicycle frame 12, and the lower spacer nut 42 is considerably shorter than the upper spacer nut 41, so that tightening of the screws 43 will cause the plate 39 and case member 34 to clampingly engage the bicycle frame and rigidly maintain the stick shift mechanism 14 in desired adjusted position thereon. Incidentally, it will be noted from FIG. 2 that the peripheral flange 37 also may be provided with suitable notches 45 for accommodating brake cables or the like and permitting the same to extend longitudinally along the upper member of the frame 12 in well-known manner.

Extending through a suitable central aperture in the case member 34 is a stud shaft 46 having an enlarged head 47 which is secured to the inner surface of the case 34 in any suitable manner. This stud shaft 46 rotatably accommodates and supports the lower end of a pointer or latch plate 48 and a lever 49, with these two members being provided with suitable inter-engaging means 51 (FIG. 4) for insuring simultaneous pivotal movements thereof on the shaft. A nylon washer 52 (FIG. 2 is interposed between the pointer or latch plate 48 and the outer surface of the main case member 34, and the outer end of the stud shaft 46 is externally threaded to receive a locking nut 53. A nylon washer 54 and a stationary spring anchor plate 55 are interposed between the nut 53 and the lever 49, whereby the manually operable lever 49 and the pointer and latch plate 48 are pivotally retained on the shaft 46. The case member 34 also preferably is provided with a pair of stops 56 for limiting such pivotal movements of the lever 49, and these stops may be formed by being struck outwardly from the body of the case 34.

The lower end of the lever 49 is provided with a keyhole slot 57 for receiving an anchoring or terminal stud 58 secured in any suitable manner to the upper or forward end of the cable 15. A cover member 59 may be provided to enclose the lower end of the lever 49 and the stud 33. This cover is formed with a peripheral flange 61 adapted to be held against the outer face of the case 34 by a retaining screw 62 (FIG. 2) extending through a suitable central aperture in the cover and cooperating with a tapped aperture in the end of the stud shaft 46. As shown in FIG. 4, the peripheral flange 61 of the cover 59 is provided with a notch 63 to accommodate the cable 15 and stud 33, while it is cut away at 64 in its upper portion to provide clearance for the manually operable lever 49 and the pointer 48 (FIGS. 2 and 3). It will be noted from the latter figures that the upper end of the pointer 48 cooperates with the indicia on the member 38 to indicate the various selectable positions to which the lever may be moved.

As best seen in FIG. 4, the lower portion of the pointer or latch plate 48, which is secured to the manually operable lever 49 for rotation on the shaft 46 therewith by the interengaging means 51, is somewhat fan-shaped and is provided with three apertures 65, 66 and 67 adjacent to, and spaced along, its lower margin. Intermediate the apertures 66 and 67, the latch plate 48 is provided with a laterally offset and upturned tongue 68 which, as best illustrated in FIG. 2, is disposed on the opposite side of the plate from its upper, laterally extending pointer end. The centers of the apertures 65, 66, 67 are disposed on an arc centered on the axis of the shaft 46.

Manually releasable means are provided for cooperation with the latch plate apertures 65, 66, 67 for automatically latching the shift lever 49 in each of its selectively adjustable positions as it is moved thereto which comprises spring-urged detent means in the form of a metal ball 69 (FIG. 5) mounted in a cup member 71. This cup member 71 extends through a suitable aperture in the main case member 34 and is secured thereto in any suitable manner. A coil spring 72 is disposed within the cup 71 behind the ball 69 which urges the latter against the latch plate 48. When the upper pointer on the latch plate 48 is disposed adjacent the center indicia on the decal 38 as shown in FIG. 3, the shift lever 49 is in its intermediate position and the ball 69 engages the intermediate aperture 66 and is resiliently retained in engagement therewith by the spring 72. It will be appreciated that as the shift lever 49 and its associated latch plate 48 are moved from this intermediate position in a counterclockwise direction viewing FIGS. 1 and 4, which constitutes a rearward movement of the upper end of the shift lever and results in a forward movement of the cable 15 to cause engagement of the low gear in the hub transmission, a peripheral portion of the aperture 66 first moves the ball 69 laterally against the action of the spring 72 and then, when the first aperture 65 has been so moved into alignment with the ball, the spring 72 urges the ball into that aperture to releasably retain the several parts in that first or low position. Similarly, when the shift lever 49 is moved in the opposite or forward direction from its intermediate position as illustrated in the drawings, the ball 69 first will be displaced from engagement with the aperture 66 and then will be urged into latching engagement with the aperture 67 when the shift lever has been moved to its high or third position. As soon as the initial operation of any such shifting movement of the lever 49 has removed the ball 69 from engagement with the intermediate aperture 66, there is very little resistance offered against continued movement of the shift lever, but action of the spring in the hub transmission which tends to move the parts automatically toward the high gear position normally is not sufficient to effect immediate movement of the sun gear through its neutral or ineffective position into high. The result may be a very appreciable lack of resistance to pedal movement which, if it is not anticipated by the rider, can result in serious injury to him.

Therefore, means have been provided for assisting operations of the shift lever 49 in either direction from its intermediate position. This assures substantially instantaneous movement of the sun gear in the hub transmission through its neutral or ineffective zone and completion of the shifting operation from intermediate to high, once it has been initiated manually, while also assisting in overcoming the action of the hub transmission spring during shifting operation from intermediate to low. This means comprises a shift lever spring 73 which is C-shaped and is anchored at its lower end in a suitable aperture in the tongue 68 on the latch plate 48. The other end of this C-spring 73 is similarly secured in a suitable aperture provided in an upper arm 74 of the spring anchor plate 55, this arm 74 being offset to accommodate such mounting of the spring as best seen in FIG. 2. As shown in FIG. 4, the spring anchor plate 55 also is provided with an arm 75 which terminates in an inwardly extending end engaging in a suitable aperture in the main case 34 to maintain the anchor plate 55 stationary.

As also is shown in FIG. 4, when the shift lever 49 and latch plate 48 are in their intermediate position, the C-spring 73 is in a dead center position and a line extending through the centers of the ends of the spring passes through the center of the shaft 46, which is the center of rotation of the latch plate 55. Therefore, movement of the latch plate in either direction from this intermediate position will allow the spring 73, which is then expanded or stretched open beyond the position it would assume if unrestrained, to contract to exert a shift-assisting force upon the lever as it is moved from second toward either first or third. Explained somewhat differently, the C-spring 73 is in an expanded or opened position with its ends separated a maximum distance from each other when the shifting mechanism is in its intermediate position of FIG. 4, being tensioned in response to movements of the shift lever toward such intermediate position. When the latch plate 48 is moved in either direction from that intermediate position, the end of the spring 73 engaged by the tongue 68 will be permitted to move closer toward its stationary end, and for a distance equal to that between arcs struck, respectively, from the center of the shaft 46, and the center of the stationary end of the spring 73, through the center of the movable end of the spring when in its intermediate position of FIG. 4. Thus, it will be seen that the previously expressed objects of this invention are attained by means of the mechanism herein described and illustrated, the apertures 65–67 of plate 48 and the spring-urged ball 69 automatically releasably latching the shift lever 49 and the hub transmission operated thereby in any selectable position, and the spring 73 assisting the rider in shifting from second to either low or high and insuring substantially instantaneous completion of a shift to high to avoid possible injuries to the rider.

It will be appreciated that the embodiment of the invention herein illustrated can be readily adapted to use with other appropriate types of transmissions while retaining the novel features therein. For example, it may be used with a four-speed hub transmission merely by redesigning the latch plate 48 to incorporate four spaced apertures instead of the three apertures 65, 66, 67. And it also will be appreciated that such detent receiving apertures may be differently located in the plate 48 relative to the lever 49 from the positions illustrated in the embodiment disclosed, or may be disposed in the lever 49, if desired.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. Manually operable mechanism for shifting a planetary gear hub transmission for a bicycle having parts positionable in low, intermediate and high operative positions, a spring urging the same toward high position, and an operating cable for moving said parts in opposition to said spring; comprising a shift lever, mounting means for pivotally supporting said lever on the bicycle, means for connecting said lever to the transmission operating cable, means for indicating low, intermediate and high positions of said lever corresponding to the comparable operative positions of said transmission, means for positionally restraining said lever in each of said positions, comprising a latch plate supported by said mounting means on an axis for pivotal movement by said lever and having a plurality of apertures spaced from each other on an arc centered on said axis, and spring-urged detent means selectively engageable with said apertures and disengageable therefrom by said shift lever, and spring means interconnected between said latch plate and said mounting means for urging said shift lever into high position after said shift lever has been moved manually from intermediate position toward high position to disengage said detent means from the intermediate said aperture.

2. Shifting mechanism according to claim 1, wherein said spring means also urges said shift lever toward low position after said shift lever has been moved manually from intermediate toward low position to disengage said detent means.

3. Shifting mechanism according to claim 2, wherein said spring means comprises a C-spring having a stationary end anchored to said mounting means, and the other end, with the spring opened beyond the position it would assume if unrestrained, being connected to said latch plate on a line extending through said stationary end and the pivotal axis of said latch plate when said shift lever is in intermediate position.

4. Manually operable bicycle gear shifting mechanism, comprising mounting means attachable to a bicycle, a shift lever supported on said mounting means for selective manual movement between low, intermediate and high positions, manually releasable means for automatically positionally restraining said shift lever in each of said positions as the latter is moved thereto, and spring means interconnected between said mounting means and said shift lever having a dead center position when said shift lever is in intermediate position and operable when the latter is moved manually therefrom toward either low or high positions to assist such manual movement of the shift lever.

5. Manually operable bicycle gear shifting mechanism according to claim 4, wherein said spring means comprises a spring which is tensioned in response to movements of said shift lever toward its intermediate position.

6. Manually operable bicycle gear shifting mechanism according to claim 5, wherein said means for positionally restraining said shift lever includes a plate movable therewith, and one end of said spring is secured to said plate.

References Cited

UNITED STATES PATENTS

| | | | |
|---|---|---|---|
| 863,422 | 8/1907 | Newton. | |
| 865,805 | 9/1907 | Sangster | 74—533 X |
| 931,656 | 8/1909 | Sangster | 192—6 |
| 991,340 | 5/1911 | McGriff | 74—36 |
| 1,110,249 | 9/1914 | Bailey. | |
| 1,467,765 | 9/1923 | McMullin. | |
| 2,027,659 | 1/1936 | Weisbrod | 74—512 X |
| 2,540,926 | 2/1951 | Zook | 74—501 X |
| 3,223,798 | 4/1963 | Armentrout et al. | 74—525 X |

FOREIGN PATENTS 61,174 10/1954 France.
(Addition to No. 1,020,378)

FRED C. MATTERN, JR., *Primary Examiner.*

C. F. GREEN, *Assistant Examiner.*